Figure 1:
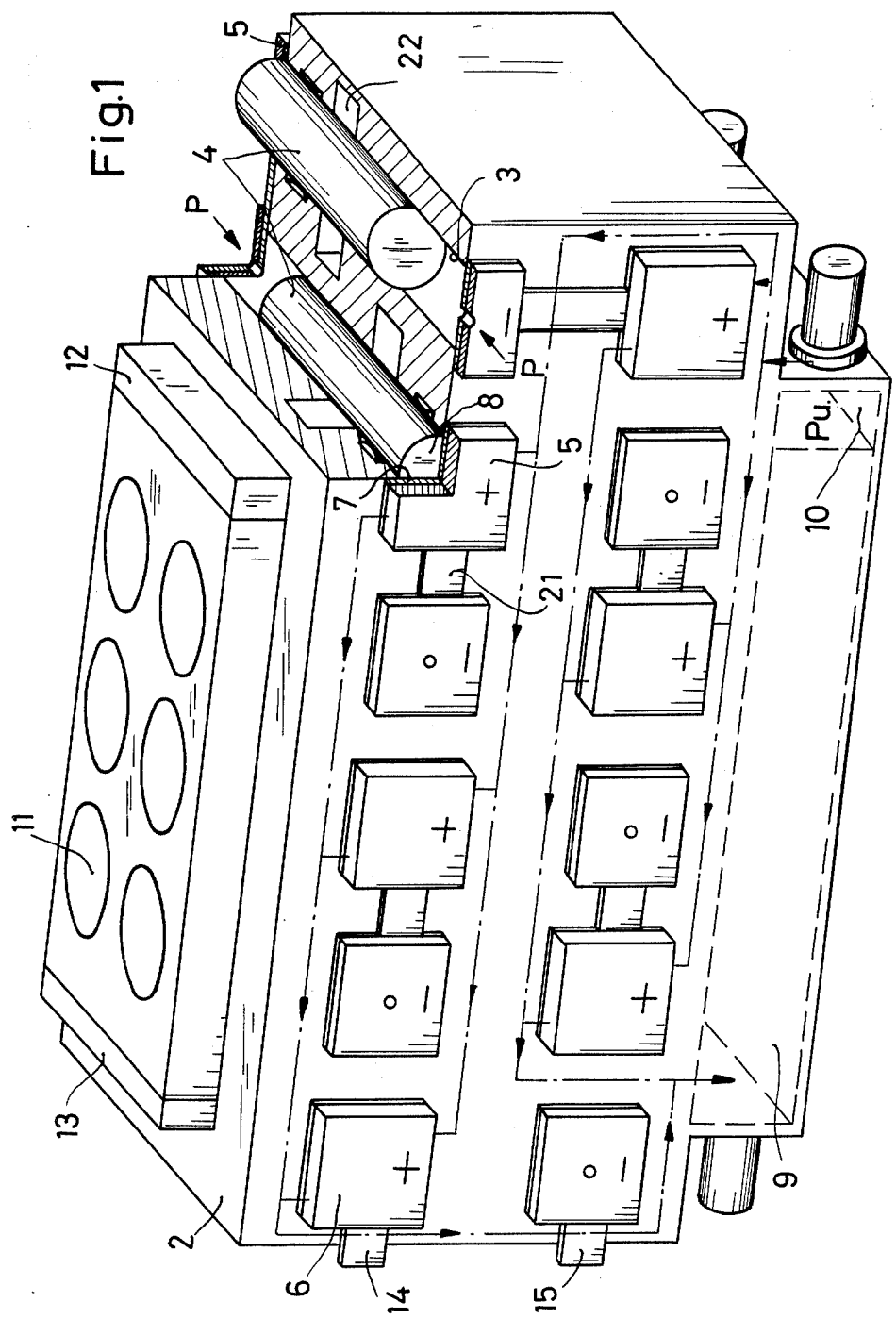

United States Patent [19]

Ruch et al.

[11] 4,169,190

[45] * Sep. 25, 1979

[54] ELECTROCHEMICAL BATTERY

[75] Inventors: Jean Ruch; Dieter Hasenauer, both of Brilon, Fed. Rep. of Germany

[73] Assignee: Accumulatorenwerk Hoppecke Carl Zoellner & Sohn, Cologne, Fed. Rep. of Germany

[*] Notice: The portion of the term of this patent subsequent to May 23, 1995, has been disclaimed.

[21] Appl. No.: 857,139

[22] Filed: Dec. 5, 1977

[30] Foreign Application Priority Data

Feb. 12, 1977 [DE] Fed. Rep. of Germany ....... 2706016

[51] Int. Cl.² .......................................... H01M 12/06
[52] U.S. Cl. ........................................ 429/27; 429/51; 429/72
[58] Field of Search ................ 429/27, 51, 68, 14, 429/18, 70, 12, 34, 149, 72, 67, 80

[56] References Cited

U.S. PATENT DOCUMENTS

| | | | |
|---|---|---|---|
| 3,043,898 | 7/1962 | Miller et al. | 429/27 |
| 3,666,561 | 5/1972 | Chiku | 429/18 |
| 3,730,776 | 5/1973 | Geisler, Jr. | 429/51 |
| 3,855,000 | 12/1974 | Jammet | 429/27 |
| 3,920,476 | 11/1975 | Black et al. | 429/68 |
| 4,091,174 | 5/1978 | Ruch et al. | 429/27 |

*Primary Examiner*—Anthony Skapars
*Attorney, Agent, or Firm*—Martin A. Farber

[57] ABSTRACT

An electrochemical battery for production of high outputs and efficiencies with high current densities comprising a plurality of cells, particularly metal-air cells each comprising a consumable electrode, and an air electrode spaced from the consumable electrode with electrolyte disposed in an electrolyte space and current take-off. The consumable electrode has a rod-shape made at least partially of a dense metal, the consumable electrode having a front face constituting a sole working surface projects sealed-off into the electrolyte space. An air electrode is spaced by the smallest distance parallel to the working surface of the consumable electrode, and an adjustable mounting for one of the electrodes maintains the spacing between the electrodes constant. The cells are arranged parallel to one another and connected in series, the air electrode and the consumable electrode of each of the cells being reversed with respect to the consumable electrode and the air electrode of the adjacent cell.

10 Claims, 2 Drawing Figures

ELECTROCHEMICAL BATTERY

The invention relates to an electrochemical battery for production of high outputs or efficiencies with high current densities, comprising a plurality of cells, particularly metal-air-cells each comprising a consumable rod-shaped electrode made at least in part of dense metal, the front face of which alone constitutes the sole working surface and which projects sealed-off into an electrolyte space, as well as an air electrode arranged parallel to the working surface and maintained spaced apart therefrom at the smallest possible constant spacing by means of a readjustable mounting of one of the electrodes, and a current take-off according to U.S. patent application Ser. No. 768,046, filed Feb. 14, 1977, Now U.S. Pat. No. 4,091,174, copending and commonly assigned, the patent issuing thereof hereby being made of reference herein. Under the term "air electrode" of course also oxygen electrodes or $H_2O_2$-electrodes are included. The term "air electrode" is only used for the sake of simplicity and not in a limiting sense.

In the named patent (application Ser. No. 768,046) there is disclosed a device for production of high outputs and efficiencies with high current densities in an electrochemical system, particularly a metal-air-cell. However, no electrochemical aggregate or unit made of a plurality of cells is described.

Accordingly, it is an object of the present invention to improve and further construct the introductory described subject matter, which is based on the task to provide an electrochemical battery made of a plurality of cells, particularly a metal-air cell unit which is simple in construction.

It is another object in accordance with the present invention to aid the solution of the above-mentioned object in the manner that the cells are arranged parallel to one another and are connected in series or in a row and the arrangement of the electrodes (4, 5) of one cell is reversed relative to the arrangement to the electrodes of the adjacent cells. By the alternating construction of the metal-electrodes and of the air-electrodes, by the series connection, the mentioned constructive problems are avoided in a simpler manner. The shortest current path is made.

It is advantageous to equip the electrochemical battery with an electrolyte-supply container (9) from which by means of one or several electrolyte pumps (10), the electrolyte is pumpable through the electrolyte spaces (7) of the individual cells. In this manner a parallel connection of the cells is made on the side of the electrolyte, which makes possible a short transportation course and optimum flow on the respective reaction places from time to time. By means of an optimization of the electrolyte channel cross-section in the individual cells, possible losses can be held small by short circuit currents in the electrolytes.

It is further advantageous to provide on the electrochemical battery a ventilator (11) by which the supply of the air electrode (5) can take place with oxygen (air) under light pressure above atmospheric. In this manner not only is the non-objectionable supply of oxygen to the electrodes achieved, but rather also a gas purging for carrying off inert gas fractions is achieved.

For starting the electrochemical battery a rechargeable auxiliary battery (13) can be provided, by which the electrolyte pump and the ventilator can be driven for a short time. After the build-up of the main battery voltage, the supplying to the pumps and ventilator is switched off and is taken over by the main battery itself. The auxiliary battery then can be charged again. The removal of the unit can occur by a simple stopping of the pumps and the ventilator. The electrolyte then flows back into the electrolyte tank and the voltage of the unit subsides.

The cells on which the invention is based constitute high output, high energy reservoirs or batteries which mechanically are rechargeable by replacement of the metal electrode. By the simple construction of the proposed electrochemical battery, particularly of the parallel arrangement of the cells with respect to one another, a simple exchange or replacement of the parts is possible. A particularly original type of recharging is then recommended if the unit is constructed such that it is subdivided into several parallel connected partial units of different service lives, for example in five partial units each of 20, 40, 60, 80 and 100% energy content. Then with use, first the element which originally only had the 20% capacity would fail. By this partial failure, 80% of the energy remains further available for use. By the large overload capacity of the cells, for example, with a voltage reduction of 20%, there can be an output increase of 60% with the usual operating conditions of the cells. The overload capacity thus makes a certain equalization for the reduced capacitance up to the occasion, since the failing partial unit is replaced by a new unit in order to return to the original energy content. This manner of operation has the advantage that a unit never totally fails which leads to a tying-up of the consumer.

With the parallel connection, the high current densities of the cells can be fully used. The energy which is produced should then be stepped-up to the desired voltage by means of a converter.

Figure 2:
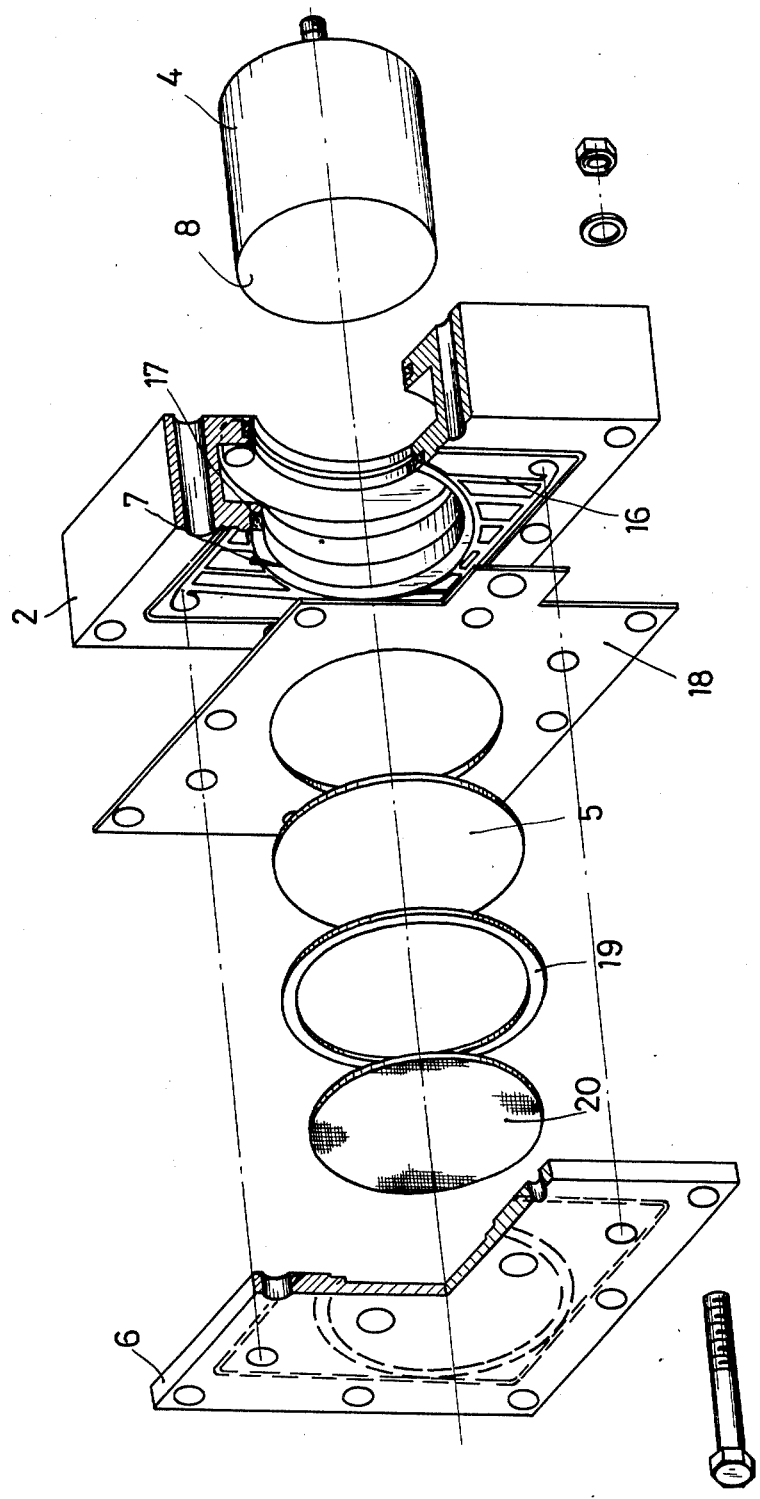

With the above and other objects and advantages in view, the present invention will become more clearly understood in connection with the following detailed description of a preferred embodiment, when considered with the accompanying drawings, of which:

FIG. 1 is a perspective view of the entire unit in accordance with the present invention, with parts being broken away; and FIG. 2 is a basic construction of each individual cell of the unit of FIG. 1, in a modified schematic exploded perspective illustration, in another scale.

The electrochemical battery 1 illustrated in FIG. 1 of the drawings has a carrier body 2 made of acrylic resin-synthetic material which is provided with a number of cylindrical bores 3, which number corresponds to the number of the cells. The cylindrical bores 3 constitute guides respectively for one rod-shaped aluminum electrode (negative) 4 each, which by means of an advancing or feeding device (not illustrated) is arranged as close as possible to an air electrode 5 (positive), with the maintenance of an electrolyte space therebetween. The follow-up guiding of the aluminum electrodes 4 can take place for example by pressurized air, which is indicated in the drawing by an arrow. Also a compression spring can be arranged between the Al-electrode 3 and the rear wall of the cells.

The correct spacing of the electrodes between the aluminum electrode 4 and the air electrode 5 is guaranteed by means of a spacer disposed in the electrolyte space. In this manner the consumable electrode 4 is pressed against a coarse metal grating. This metal grating is mounted insulated opposite with respect to the air electrode 5 and can also be used for current removal or feed.

The air electrodes 5 are each respectively mounted on the outside of the carrier body 2 with separate carriers and holders and stand in connection with a ventilator 11 (in a not illustrated manner) which transports the air to the electrodes 5. Between the carrier plates 6 of the air electrodes 5 and the outer surface of the carrier body 2 an electrolyte space 7 is left free on each cell, the electrolyte space being limited by a front surface 8 of the aluminum electrode 4. Each electrolyte space 7 is connected with an electrolyte container 9 (as indicated in the drawing with dash-dotted arrowed lines), a pump 10 of which carries out the feeding and removal of the electrolyte in the electrolyte space 7 respectively in and out.

The individual cells, according to FIG. 1 of the drawing 12 in number are electrically connected in series. This is facilitated by the alternate construction of the aluminum electrodes 4 and the air electrode 5 such that the arrangement of the electrodes of a randomly singled out cell is turned around or reversed relative to the cell arranged next to it. The entire voltage can be tapped off on poles 14, 15.

The construction of the individual cells can be gathered from the following description of FIG. 2 of the drawings, whereby a different illustrative scale has been selected. Particularly the aluminum electrode 4 which is illustrated schematically in the drawing of FIG. 1 is substantially longer than that used in FIG. 2 of the drawing and corresponding to the carrier body shown in FIG. 2 illustrates only one bound all around cutout section of the carrier body 2 of FIG. 1.

The aluminum electrode 4, formed in the shape of a cylinder, projects with its front surface 8, which alone constitutes the active surface, into the electrolyte space 7 and is purged by the electrolytes, the latter being supplied by means of channels 16 from the electrolyte container 9 via one of the aligned openings through the carrier plate 6 (FIG. 2) indicated by the outer dot-dashed lines. The jacket or peripheral surface of the aluminum electrode 4 is perfectly covered by a seal 17 and therefore cannot be acted on by or receive the electrolyte. It is important that the surrounding seal 17 seals exactly with the active front surface 8 of the aluminum electrode 4. The seal for example is made of an elastomeric material and is secured in a corresponding recess of the carrier body 2 as illustrated. In this cell formation the aluminum electrode 4 is contacted (not illustrated) on its rear side by a metal spring which presses thereon, which spring serves for the follow-up forward pushing of the electrode. The electrolyte space 7 (see arrow) is located between the air electrode 5 and the consumable aluminum electrode 4, whereby a contact sheet 18 which is placed therebetween and against the air electrode 5 serves for the current removal or take-off. Behind the air electrode 5 there are arranged a seal 19 and a support grating 20, which are held by the carrier plate 6. By the sealing it is guaranteed that no electrolyte can get outside or into the oxygen-gas space. The contact sheet 18 is continued by a connector or post 21 which establishes the series connection to the next cell in the battery according to FIG. 1.

A detailed description of the construction of the individual cells per se of the entire device is provided in patent application Ser. No. 768,046.

The end carrier plate 6 is formed with eight outermost bores through which screw bolts (schematically illustrated at the left-side in FIG. 2) are inserted therein, which produce the connection of the individual parts (6, 18, 2) of the cell to one another with cooperating nuts (illustrated at the right-side in FIG. 2).

On the inside in the end carrier plate 6 there is positioned a seal (schematically illustrated by double rectangular dashed lines in the drawing), which encircles connection bores for feeding and removing the electrolyte, and a feed bore and a removal bore for the oxygen, the latter bores being arranged inside of a recess (illustrated by double circular dashed lines) which forms the gas space of the air electrode 5. Between the air electrode 5 and the carrier plate 6, the support grate 20 is arranged along with the insertion of the annular seal 19, which support grate is made of synthetic material and prevents the adherence of the oxygen electrode 5 to the carrier plate 6, the latter constituting the air electrode support. The annular seal 19 prevents the entrance of electrolyte liquid in the inner gas space. It may be seen from the drawings that for its holding, a graduation or step-off is provided in the inner surface of the end carrier plate 6 at the transition to the gas space.

The oxygen electrode 5 substantially comprises a porous carrier for an active paste in the form of a thin plate with a circular-shaped periphery. The current removal member 18 which is made of metal is adjusted to this shape, which member 18 centrally is formed with a circular recess, which member further however is square as is the end carrier plate 6. The circular recess has a smaller diameter than that of the oxygen electrode 5, so that a contacting edge range arises therefor. The current removal member 18 is provided in a corresponding manner with outermost bores for the insertion of the screw bolts as well as with electrolyte communication connection bores (indicated by the outer dot-dashed lines) and further has a contact lug for securing of the connector 21 thereto.

The consumable electrode 4 is held in the carrier body 2. The carrier body 2 is provided with bores for the passage of the connecting screw bolts. A central bore runs centrally through the carrier body 2, in which the consumable electrode 4 is inserted in the operative or active condition. In the wall of the bore there are imbedded, respectively, on the inner side and on the outer side, both the seal 17 and another, rear annular seal, respectively, of which the front seal 17 seals off the electrolyte space toward the outside. The seal 17 has a conically extending inner surface which form a sharp or high-definition sealing edge toward the electrolyte space, which lip-like tightly surrounds the consumable electrode 4. The seal 17 is made of a material which is not attacked or not corroded by the electrolyte.

In the wall of the central bore, between the seal 17 and the rear annular seal, there is formed a hollow space in the form of an annular region which opens and communicates with the central bore, and which annular region is fillable with a tempering medium via connection channels.

In the inner surface, that is the surface of the carrier body 2 which points to the oxygen electrode 5, the communication connection bores flow into blind holes or pocket holes (at the right-hand end of the outer dot-dashed lines in FIG. 2), to which there are connected the distribution channels 16 for the electrolyte. The distribution channels comprises branches of side-cut canals which are connected with one another and which are distributed uniformly about the central bore, which guarantee a uniform distribution and flow of the electrolyte to the electrode surface 8. The electrode face 8 is the sole working surface of the consumable electrode 4, which by means of the front annular seal 17 is sealed-off from the remainder and periphery of the consumable electrode 4, and which is arranged at a close constant distance parallel to the oxygen electrode 5.

The consumable electrode 4 has a connection lug to which an electrical conductor can be connected for taking off the current.

The innermost feed and removal bores, respectively, in the carrier plate 6 which communicate into the gas space serve for conducting the oxygen or oxygen containing fuel.

It is to be recognized that the consumable electrode 4 is pushable in the carrier body 2 for the purpose of maintaining a constant spacing of the electrodes. However the special device for this pushing is not shown in the drawings for clarity.

The sealing of the electrode space is guaranteed by the rectangular indicated seal in the inner surface of the carrier plate 6 and by a rectangular seal (indicated by double solid rectangular lines) in the inner surface of the carrier body 2.

Referring now again to FIG. 1, for starting of the battery 1, a rechargeable auxiliary battery 13 is provided, which is secured on the carrier body 2 opposite to the electrolyte container 9.

The oxygen feed to the air electrode 5 takes place by means of a ventilator 11 secured on the same side, the connection thereof to the individual carrier plates 6 being not illustrated.

Moreover a cooling device 12 is provided on the battery, by which a cooling medium (in other embodiment examples a tampering medium) is able to be fed to hollow spaces 22 in the carrier body 2.

The following are two examples of a battery embodiment in accordance with the present invention numerically described.

|  | 1 kW/40 kWh 24 volts/41.66 A | 10 kW/400 kWh 48 volts/208 A |
|---|---|---|
| Voltage per cell with i - 0.35 A/cm$^2$ | 1.2 volts | 1.2 volts |
| Number of cells | 20 | 40 |
| Surface per electrode | 120 cm$^2$ | 600 cm$^2$ |
| Consumable length Al | 2.18 cm | 2.18 cm |
| Diameter of one Al-electrode | 12.36 cm | 27.6 cm |
| Cell surface | 206 cm$^2$ | 880 cm$^2$ |
| Aggregate Unit surface | 4.120 cm$^2$ | 35.200 cm$^2$ |
| Effective length of one Al- electrode | 3.68 cm | 3.68 cm |
| Volume of one Al-electrode | 441.6 cm$^3$ | 2,208 cm$^3$ |
| Weight of one Al-electrode | 1.2 kg | 6 kg |
| Entire Al-weight | 24 kg | 240 kg |
| Depth of the aggregate unit | 5.18 cm | 5.18 cm |
| Volume of the aggregate unit | 21,340 cm$^3$ | 181,280 cm$^3$ |
| Difference cell surface - electrode surface | 86 cm$^2$ | 280 cm$^2$ |
| Total packing surface | 1.720 cm$^2$ | 11.200 cm$^2$ |
| Volume of the package | 8.9 l | 58 l |
| Weight of the package | 11 kg | 70 kg |
| Weight of the electrolyte | 38 kg | 380 kg |
| Weight of the oxygen | 13 kg | 130 kg |
| Weight of the | | |

-continued

|  | 1 kW/40 kWh 24 volts/41.66 A | 10 kW/400 kWh 48 volts/208 A |
|---|---|---|
| oxygen - electrode | 1.2 kg | 12 kg |
| Weight of the pump | 5 kg | 25 kg |
| Weight of the connector | 3 kg | 10 kg |

While we have disclosed one embodiment of the invention, it is to be understood that this embodiment is given by example only and not in a limiting sense.

We claim:

1. An electrochemical battery for production of high outputs with high current densities, comprising
   a plurality of cells particularly metal-air cells, each comprising
      a consumable electrode,
      an air electrode spaced from said consumable electrode with electrolyte disposed in an electrolyte space defined therebetween,
      means for taking-off current from one of said electrodes,
      said consumable electrode having a rod-shape and being made of a dense metal at least in part, and constituting a metallic solid body, said consumable electrode having a front face constituting a sole working surface and projecting sealed-off into the electrolyte space,
      means for sealing said front face of said consumable electrode relative to the electrolyte space, said sealing means constitutes a seal substantially flushly surrounding the periphery of said front face,
      said air electrode disposed directly axially spaced opposite from said front face of said consumable electrode by a smallest distance parallel to the working surface of said consumable electrode,
      means for axially adjustably displaceably mounting only one of said electrodes for maintaining the spacing between said electrodes constant with a predetermined axial spacing,
   said plurality of cells being arranged parallel to one another and connected in series, said air electrode and said consumable electrode of each of said cells being reversed with respect to said consumable electrode and said air electrode of the adjacent of said cells.

2. The electrochemical battery as set forth in claim 1, further comprising
   an electrolyte supply container operatively connected to the electrolyte space of each of said cells,
   at least one electrolyte pump means for pumping the electrolyte from said electrolyte supply container through the individual said electrolyte space of said cells, respectively.

3. The electrochemical battery as set forth in claim 1, further comprising
   a ventilator means for supplying said air electrode of each of said cells with oxygen under light above atmospheric pressure.

4. The electrochemical battery as set forth in claim 1, further comprising
   a chargeable auxiliary battery means for starting the electrochemical battery.

5. The electrochemical battery as set forth in claim 1, further comprising
   a carrier body made of acrylic resin-synthetic material, all said cells are disposed in said carrier body, said carrier body is formed with a plurality of hollow space means for circulation of a tempering means, and bore means for feeding and removing, respectively, the electrolyte relative to said electrolyte space, as well as additional bore means for supplying of oxygen to said air electrodes.

6. The electrochemical battery as set forth in claim 5, wherein
said carrier body is formed with a plurality of cylindrical bores oriented parallel to one another and spaced from one another and disposed in at least one plane,
said consumable electrode constitutes a metal-electrode of each of said plurality of cells and is disposed in said cylindrical bores, respectively, and displaceably arranged therein for a follow-up adjustment.

7. The electrochemical battery as set forth in claim 5, further comprising
outer lying cell connector means for connecting said cells in series with one another, respectively.

8. The electrochemical battery as set forth in claim 1, wherein
said plurality of cells constitute a plurality of parallel connected partial units of different service lives.

9. The electrochemical battery as set forth in claim 8, wherein
said plurality of partial units constitute five partial units of each 20, 40, 60, 80 and 100% energy content, respectively.

10. The electrochemical battery as set forth in claim 8, wherein
said partial units each comprise a plurality of said cells.

* * * * *